June 13, 1944. J. L. BERGER 2,351,475
METHOD AND APPARATUS FOR SHAPING AND SHEARING SHEET MATERIALS
Filed Oct. 28, 1941
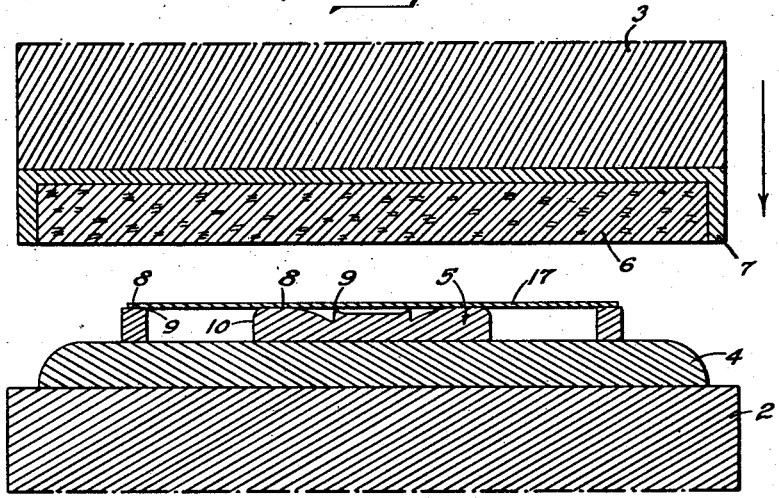
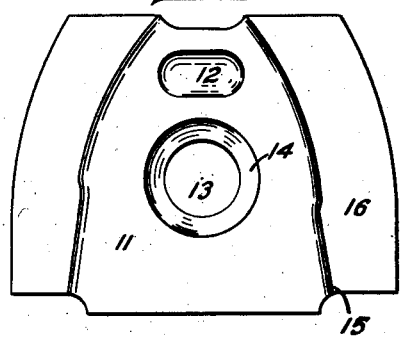
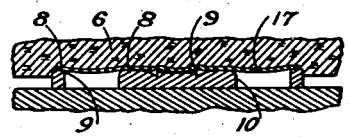
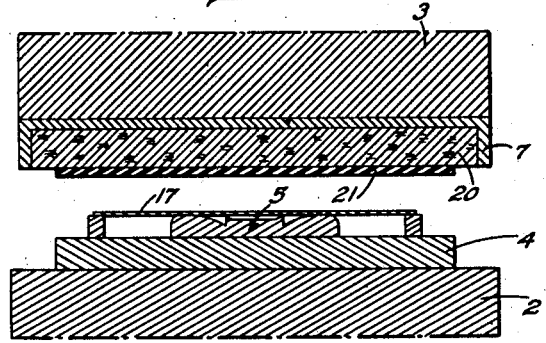
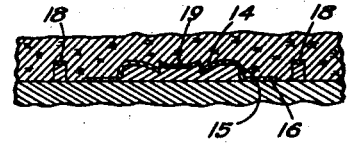

Patented June 13, 1944

2,351,475

UNITED STATES PATENT OFFICE 2,351,475

METHOD AND APPARATUS FOR SHAPING AND SHEARING SHEET MATERIALS

John L. Berger, Columbia, Pa., assignor to Armstrong Cork Company, Lancaster, Pa., a corporation of Pennsylvania Application October 28, 1941, Serial No. 416,799

7 Claims. (Cl. 113—42)

This invention relates to a method of shaping and/or shearing sheet materials into predetermined form and, more particularly, to an improved method of economically and quickly shaping and/or shearing sheet metal into desired shapes precisely conforming to the forming surface.

The so-called Guerin process of forming and shearing sheet metal into dseired shape is disclosed in United States Patents Nos. 2,055,077, granted September 22, 1936; 2,133,445, granted October 18, 1938; and 2,190,659, granted February 20, 1940. The apparatus used in such process includes a support or table adapted to support a die about which the metal sheet may be formed and a head member movable toward the table. Secured to the head member is a fluid-like, flowable material such as rubber which has a tendency to deform in a manner to surround a body against which it is pressed. To restrain the rubber material from lateral flow when it is under vertical pressure, it is inclosed or confined within a box or wall so that the rubber material is contained within a completely closed space prior to and during the time the rubber is in engagement with the die and the upper surface of the table. Pins are provided in the die which extend through openings in a metal sheet to be shaped to suitable form and serve to prevent lateral slippage of the metal sheet in relation to the die. The process consists essentially in placing a sheet of metal over the die and forcibly applying pressure through the flowable rubber to the metal sheet to cause it to assume a shape as near as possible to the contour of the die.

This process has many advantages particularly when it is desired to form a small number of metal parts since it eliminates the relatively expensive companion punch and die members, and the skill and time required to dispose them in mating relationship in ordinary punch presses. Its disadvantages reside in the fact that extremely high forming pressures cannot be used due to the lateral flow of the rubber with the consequence that unsatisfactory and incomplete formation of the shaped article is obtained and results in further expensive hand operations necessary to form the article to required shape. In addition, due to permitted slippage of the sheet, wrinkles in the shaped article are frequently encountered which need necessarily be pounded out by hand. The fact that a fluid-like material such as rubber is used permits inadequate formation of the lower portion of the shaped article especially since the side-walls of the article formed are always under inadequate pressure which permits them to spring back when the article is removed from the forming surface.

The chief object of my invention is to provide an improved process in which the disadvantages discussed above are eliminated. An object of my invention is to provide a shaping and/or shearing process in which the pressure applied to the metal sheet being shaped is substantially only in a single direction, preferably, a vertical direction. A further object is to provide a process in which the metal sheet is effectively clamped to the die and thus held against lateral movement or flow. A still further object is to provide a process in which the metal sheet is deformed to the precise contour of the forming surface by the application of forces through a pressure pad capable of transmitting applied forces substantially only in a single direction in contradistinction to a rubber pad in which applied forces are transmitted equally in all directions. A still further object is to provide a pressure pad capable of transmitting applied forces substantially only in a single direction and which posseses a wear resistant facing disposed over at least the die engaging portion of such pad.

This invention relates to a process of shaping and/or shearing sheet metal to desired contour by means of a suitable die and a pressure pad capable of transmitting applied forces substantially only in a single direction. The process consists essentially in compressing a compressible material such as natural cork or suitable cork composition, which is capable of transmitting applied forces substantially only in the direction of such forces, against a metal sheet disposed over a die to securely clamp a portion of the sheet against a flat surface of the die, and continuing the application of compressive forces to the material to cause the unsupported portion of the sheet to conform to the side wall of the die. When it is desired to shear the sheet to form a blank to be shaped, the compressible material clamps the sheet securely in place against the flat surface of the die and the continued application of compressive forces creates tensile forces in the unsupported portion of the sheet which causes it to shear adjacent the shearing edge of the die. It will be understood, of course, these steps may be combined as desired and a blank of any desired contour may be sheared from the metal sheet and such blank shaped to desired configuration without removing it from the press. Preferably, the pressure pad of cork is provided with a facing over at least the die engaging portion of the pad, such facing being more wear resistant than the cork material although this is not essential. The provision of such wear resistant facing does increase to a considerable degree the service life of the cork pad.

The accompanying drawing illustrates a preferred embodiment of my invention, in which Figure 1 is a sectional view showing a simple form of apparatus by which my invention may be practiced;

Figure 2 is a plan view of an article shaped in accordance with my process;

Figure 3 is a diagrammatic view illustrating a sheet of metal disposed between the die and the pressure pad which is being sheared to form a blank;

Figure 4 is a diagrammatic view illustrating the metal blank shaped to form the article shown in Figure 2; and Figure 5 is a sectional view illustrating a modified form of pressure pad in use in the apparatus of Figure 1.

Referring to the drawing, there is shown in Figure 1 two co-operating elements 2 and 3 which are adapted to be moved relatively together and apart under pressure. Member 2 may be considered a support or table and member 3 may be considered a head which moves toward the table. A bolster plate 4 is disposed over and secured to the table 2. Disposed on the plate 4 is a die designated generally at 5 which in the ordinary course of use is merely laid on the plate 4 although it will be understood it may be formed integral with the plate 4 or table 2 if desired.

Secured to the lower portion of the head member 3 is a yieldable pressure pad 6. The pad 6 is formed of a compressible material such as natural cork or cork composition which is capable of transmitting forces applied thereto substantially only in the direction of such forces. That is, the pad 6 is formed of a material which is substantially incapable of transmitting vertical forces applied thereto in more than a minute amount in lateral directions as contrasted with rubber or water, for example, which transmit such forces in equal amounts in all directions. To avoid rupture of the cork pad 6 in use and thus considerably prolong its service life, I prefer to confine it within a box or container 7 which may be bolted to the head 3. The container 7 may be formed of wood or metal and is designed to fit over the bolster plate 4 when the head member 3 is advanced toward the table 2.

As stated above, the yieldable pressure pad 6 may be formed of natural cork or of cork composition closely simulating the physical characteristics of natural cork. A suitable composition which I have found satisfactory for the manufacture of pressure pads comprises cork particles bound together by a thermosetting binder consisting of a phenolaldehyde resin such as the phenolic condensation product formed by the reaction of phenol and paraformaldehyde in the proportions of 1 mol of phenol to 1½–2 mols of paraformaldehyde. The binder sets under the application of heat and the resulting composition is compressible but not plastic, flowable or displaceable under pressure. To render the composition more flexible, a plasticizing agent such as glycerine, ethylene glycol or diethylene glycol in a minor amount may be added to soften the cork particles. Other thermosetting binders such as urea-formaldehyde resin, glue, casein and the like may be used in place of the binder disclosed above.

The die 5 includes flat surfaces 8, shearing edges 9, and forming portions 10 as hereinafter explained and is adapted to form an article such as the wing tip element shown in Figure 2. Such article possesses a flat upper surface 11 containing an indentation 12 and an opening 13 surrounded by a downwardly extending flange 14 and a side wall 15 terminating in an outwardly extending flange 16 disposed in a plane below the plane of the flat upper surface 11.

I will now describe my improved process by reference to Figures 1, 3 and 4. A sheet 17 of metal such as aluminum or aluminum alloys is disposed over the die 5. The head 3 is moved downwardly toward the table 2 compressing the pad 6 against the metal sheet 17, securely clamping the sheet against the flat surfaces 8 of the die 5 and preventing lateral slippage of the sheet under pressure. As downward movement of the head continues, the compressive forces grow greater and force the unsupported portions of the metal sheet downwardly into the cavities in the mold thus setting up or creating tensile forces in the unsupported portions of the sheet. Since the sheet is securely held at the flat surfaces 8 of the die, such forces cause the sheet to shear adjacent the shearing edges 9 which forms a metal blank of suitable contour. As shown, the edges 18 and a center 19 are sheared in the formation of the blank thus forming a central opening and a periphery of desired contour. The straight line pressure transmitted by pad 6 continues and forces the unsupported portions of the blank downwardly to conform to the forming portions 10, that is the side walls and bottom of the die. In Figure 4, I have shown the shaped article before it is removed from the die.

It will be understood the improved metal shaping resulting from my process is due primarily to the use of a cork pad which transmits forces applied thereto substantially only in the direction of such forces. The use of such pressure pad permits the application of stronger forces at the critical points such as the shearing edges and the junctures of the side walls and flat surfaces and results in cleanly sheared regular lines, corners which closely correspond to the configuration of the die, and eliminates to a substantial extent the "spring back" of the walls of the formed article which of course prevents its conformation to the wall of the die.

In Figure 5, I have illustrated the apparatus of Figure 1 provided with a modified form of pressure pad. The pad illustrated comprises a compressible and yieldable cork backing 20 of predetermined area formed as above described and a resilient rubber facing 21 disposed over the die and forming a wear resistant surface for the die engaging portion of the cork pad. It will be noted the backing 20 is confined by the box 7 to avoid side rupture thereof while the rubber facing is unconfined and may or may not be secured to the backing. The purpose of the rubber facing 21 is primarily to increase the service life of the cork pad 20 by filling the bottom of the cavities during metal shaping thus preventing excessive distortion and strain of the cork pad which occurs when the cork pad need be distorted to the extent necessary to fill the bottom of the die cavities. It also obviates the effect of the shearing edges of the die upon the cork pad and thus increases its effective service life. It will be understood, of course, any of the various artificial rubbers such as polymerized chloroprene, for example, may be used in place of natural rubber.

My invention provides an improved process of metal shaping which permits more accurate and satisfactory metal bending and shearing than heretofore obtainable. My process may be economically and quickly carried out and is particularly adapted for the production of a small number of shaped metal articles since the apparatus may be quickly set up without particular alignment of parting members. The pressure pad I provide is economical and easily manufactured and has a long period of useful service. My invention permits the use of pressures as high as 5500 pounds per square inch which is considerably greater than pressures heretofore ued in the industry.

While I have described and illustrated a preferred embodiment of my invention, it will be understood my invention is not limited thereto but may be otherwise embodied within the scope of the following claims.

I claim:

1. In the method of shaping sheet metal by means of a die having a flat surface and a side wall, the steps which comprise compressing a cork pad capable of transmitting forces applied thereto substantially only in the direction of such forces against a sheet of metal disposed over the die to securely clamp a portion of the sheet against the flat surface of the die, and continuing the application of compressive forces to said cork pad to cause the unsupported portion of the sheet to conform to the side wall of the die.

2. In the method of shaping sheet metal by means of a die having a flat surface and a side wall, the steps which comprise forcing a pressure pad including a confined yieldable thick cork backing and a resilient unconfined rubber facing thinner than the cork backing against a sheet of metal disposed over the die to securely clamp a portion of the sheet against the flat surface of the die by compression of the backing, and continuing the application of compressive forces to the pad to cause the unsupported portion of the sheet to draw downwardly and conform to the side wall of the die.

3. In the method of shearing and shaping a metal sheet by means of a die having spaced apart flat surfaces, a shaping portion and a shearing edge, the steps which comprise compressing a cork pad capable of transmitting forces applied thereto substantially only in the direction of such forces against a sheet of metal disposed over the die to securely clamp the sheet against the flat surfaces of the die and thus prevent lateral flow of the sheet, continuing the application of compressive forces to the cork pad to set up tensile forces in the unsupported portion of the sheet thus causing it to shear adjacent the shearing edge of the die, and continuing the application of pressure to said sheet to cause the unsupported portion of the sheet to conform to the shaping portion of the die.

4. In the method of shearing and shaping a metal sheet by means of a die having spaced apart flat surfaces, a shaping portion and a shearing edge, the steps which comprise forcing a pressure pad including a confined, yieldable thick cork backing and an unconfined resilient rubber facing thinner than the cork backing against a sheet of metal disposed over the die to securely clamp the sheet against the flat surfaces of the die by compression of the backing and thus prevent lateral flow of the sheet, continuing the application of compressive forces to said pad to set up tensile forces in the unsupported portion of the sheet thus causing it to shear adjacent the shearing edge of the die, and continuing the application of pressure to said sheet to cause the unsupported portion of the sheet to conform to the shaping portion of the die.

5. In a device for shaping and shearing sheet metals, the combination of a press having cooperating members adapted to be moved relatively together and apart under pressure, a container on one of said members, a yieldable, compressible cork backing capable of transmitting forces applied thereto substantially only in the direction of such forces confined within said container, and a resilient, unconfined rubber facing thinner than the cork backing disposed over at least the die engaging portion of the cork backing.

6. In a device for shaping and shearing sheet metals, the combination of a press having cooperating members adapted to be moved relatively together and apart under pressure, a container on one of said members, a yieldable, compressible cork backing of predetermined area capable of transmitting forces applied thereto substantially only in the direction of such forces confined within said container, and a resilient, unconfined rubber facing thinner than the cork backing and of less surface area than the cork backing forming a wear-resistant surface for the die engaging portion of the cork backing.

7. In a device according to claim 6 in which the cork pad comprises a mass of cork particles held together by a binder.

JOHN L. BERGER.